United States Patent Office 2,934,183
Patented Apr. 26, 1960

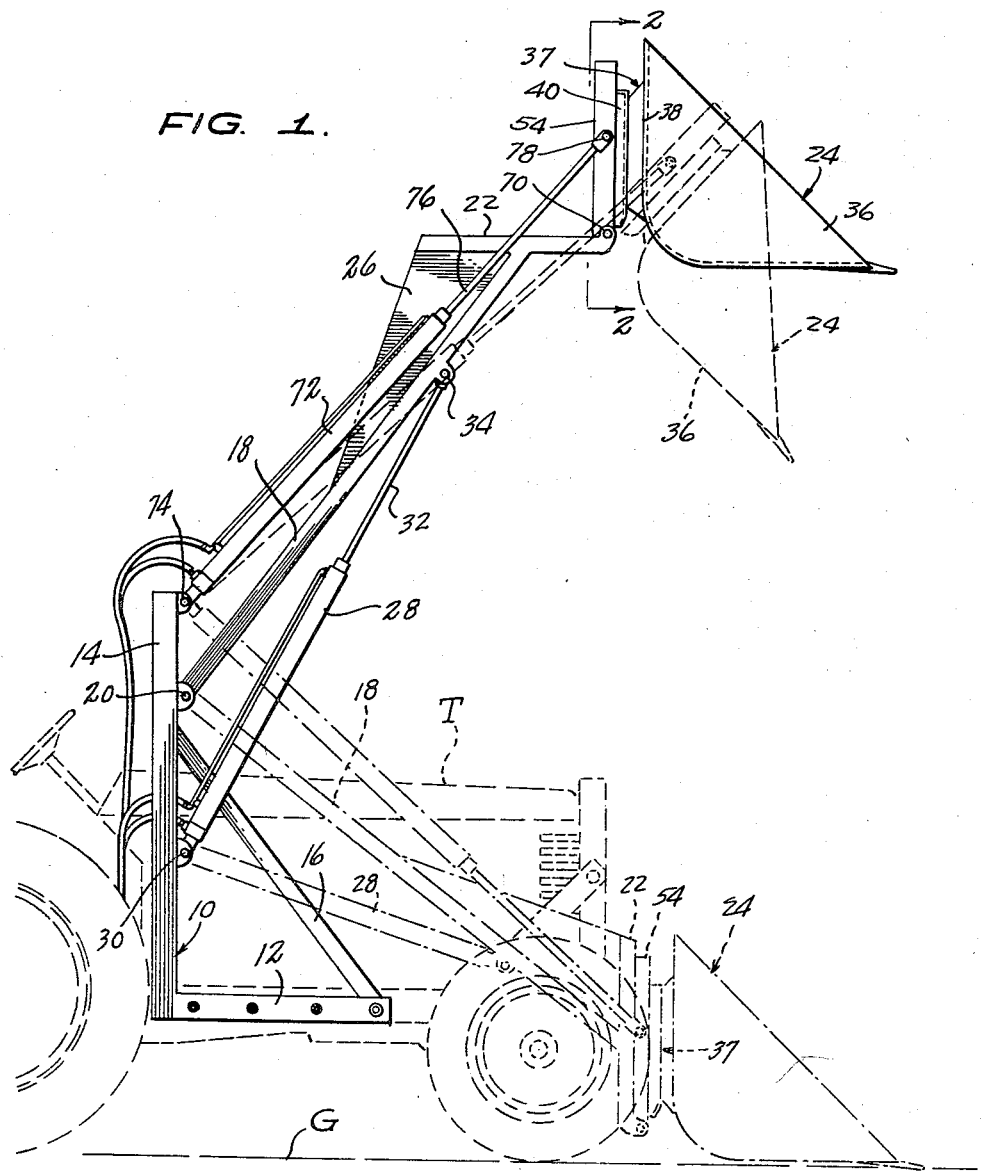

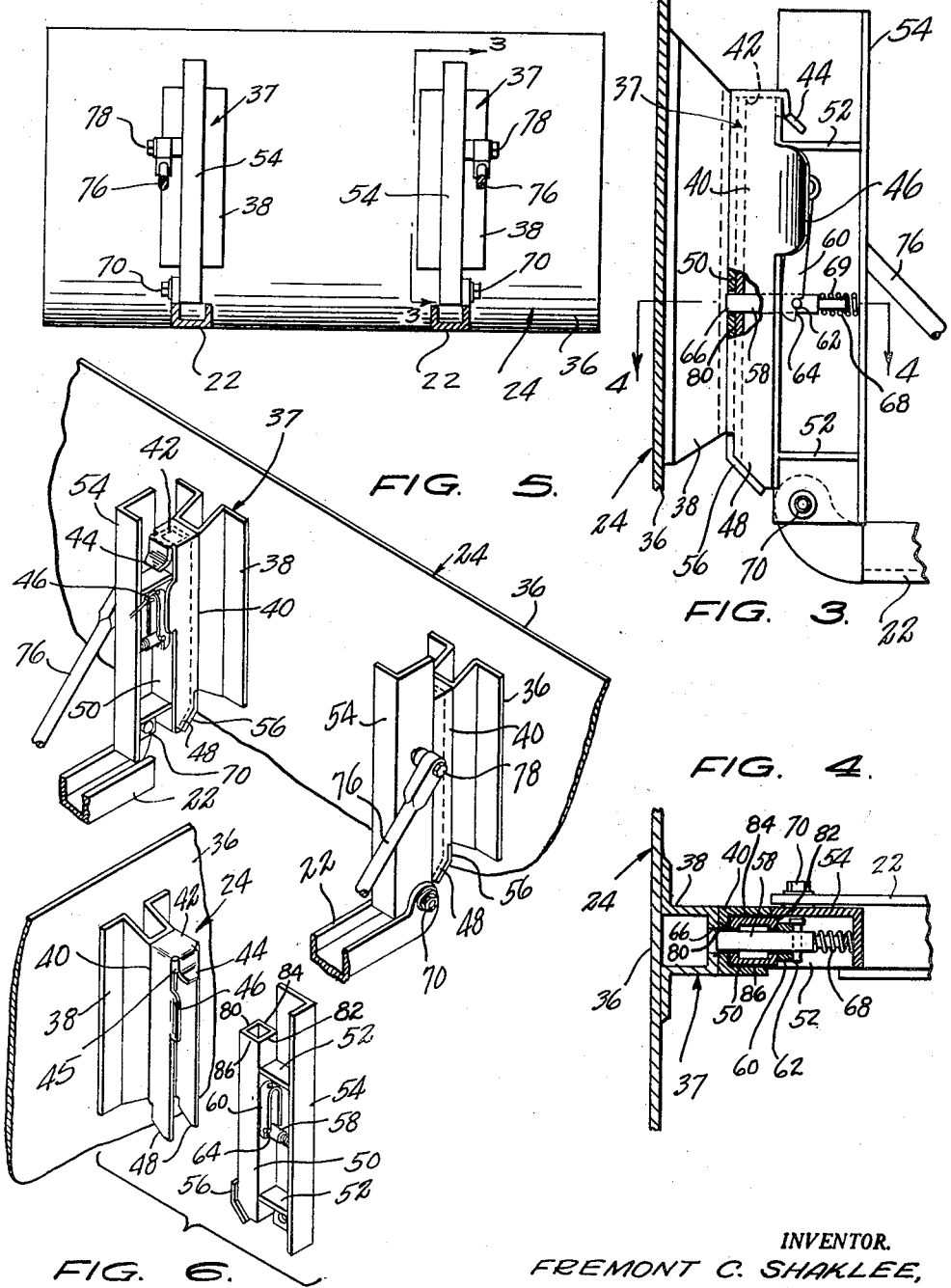

2,934,183

AUTOMATIC COUPLER

Fremont C. Shaklee, Enid, Okla.

Application March 9, 1956, Serial No. 570,562

3 Claims. (Cl. 189—36)

The present invention relates generally to coupling devices. More particularly, the invention has reference to a coupling device adapted to automatically join any of various components of mechanical devices.

Heretofore, the coupling of mechanical components, such as the coupling of a scoop to a lift mechanism of a tractor or other vehicle, has in many instances involved considerable difficulty. In some instances, the components are permanently coupled, that is, one of the components is not intended to be removable relative to the other, and this as a result reduces measurably the versatility of the machinery. For example, in the instance given above, the scoop may be pivotally connected to its associated lift mechanism by fastening elements that are ordinarily not readily separated from the pivotally joined structures. Such fastening elements might, for example, be rivets or the like, and the replacement of the scoop would be carried out, in this instance, only with considerable difficulty.

In other instances, while one component may be detachably connected to the other, the making of the connection or the detachment of the portions of the machinery involved, is effected manually, and requires excessive time, the use of skilled workers, the use of tolls, etc.

In view of the above, the broad object of the present invention is to provide an automatic coupling device which can be used for quickly connecting or disconnecting any of various units of tools, machinery, or other equipment, to or from, as the case may be, any vehicle or unit of machinery capable of being moved or having moving parts to which said units need to be attached.

A more specific object is to provide a coupling of the type referred to which, when the tool unit, implement, or the like is attached to an associated support structure, will insure a strong, rigid connection between said unit and supporting structure.

Still another object is to provide an automatic coupling means of the type referred to which will be so designed as to include a first portion carried by a support structure such as the lift mechanism of a tractor, which first portion will be connectable in mating relationship to a second portion on the attachable tool unit. The construction is such as to permit interchange of various different types of tool units, such as scoops, platforms, etc., with each unit having one of said second portions thereon, connectable to the first portion carried by the support structure.

Still another object is to provide a coupling device of the nature referred to that will not interfere with the normal use of the tool unit, or of the associated supporting structure.

A further object of importance is to provide coupling means as described that not only will permit the ready attachment or detachment of a particular tool unit or the like, but also will permit these operations to be carried out with maximum facility and safety.

Yet another object is to provide a device of the nature referred to that will be so designed as to provide an elongated connection between the joined structures, having the characteristic of resisting stresses exerted in any direction relative to, and tending to weaken or break, the connection.

Yet another object is to provide a connecting device of the nature described that can be incorporated in existing machinery, tool units, etc., with a minimum of modification or redesign of structures of this type, can be manufactured at a relatively low cost, considering the benefits to be derived from the use thereof, and will, despite its simplicity and relatively low cost of manufacture, be rugged and trouble-free in operation.

Other objects will appear from the following description, the claims appended thereto, and from the annexed drawing, in which like reference characters designate like parts throughout the several views, and wherein:

Figure 1 is a side elevational view of the coupling device associated with a scoop and lift mechanism carried by a tractor which has been shown in dash-dotted lines, the dotted lines showing the coupling device and the associated portions of the machinery in position for tilting the scoop, the chain-dotted lines showing the lift mechanism and scoop in lowered position;

Figure 2 is an enlarged transverse sectional view on line 2—2 of Figure 1, showing the coupling device in rear elevation;

Figure 3 is a sectional view, still further enlarged, substantially on line 3—3 of Figure 2, the coupling device being shown in side elevation with a portion thereof shown in section;

Figure 4 is a sectional view, on the same scale as Figure 3, on line 4—4 of Figure 3;

Figure 5 is a fragmentary, rear perspective view of the coupling device together with the associated portions of the scoop and lift mechanism; and Figure 6 is a fragmentary, exploded, rear perspective view of the coupling device.

Referring to the drawings in detail, the coupling device constituting the present invention has been illustrated in position to detachably connect together a scoop and a lift mechanism, carried by a tractor T. At this point, it will be understood that the environment in which the coupling device has been illustrated is merely one of many in which the coupler can be used to advantage, and is offered simply to illustrate one use to which the coupling device can be readily put. As will presently appear, the automatic coupler can actually be used to provide a quickly attachable and detachable coupling between any two components of machinery that are to be rigidly connected in their operative relationship. Thus, the coupler can be used on machinery carried by a truck, tractor, automobile, boat, combine, hoist, or any other vehicle or machine having a part to which another component, such as a tool, implement, or the like is to be connected.

In any event, in the illustrated example the coupling device is shown as including a first portion, carried by a tractor-attached lift mechanism including a frame generally designated 10. The frame 10 includes, at opposite sides of the tractor, L-shaped frame members each of which includes a horizontal leg 12 fixedly secured to the associateted side of the tractor frame, said leg 12 being integral at one end with an upwardly projecting vertical leg 14, a brace 16 being fixedly secured at opposite ends to and extending between the legs 12, 14.

The illustrated lift mechanism, which per se is conventional, includes a main arm 18 pivotally connected at one end, as at 20, to the leg 14 adjacent the upper end of leg 14, for vertical swinging movement. The leg 18 shown in Figure 1 would be one of a pair, the other leg being disposed at the opposite side of the tractor.

Integral or otherwise made rigid with the other end of leg 18 is the intermediate portion of a support bar 22 on which is pivotally mounted a support means to which, in the illustrated example of the invention, a scoop 24, also conventional per se, is attached. The support bar 22 of each arm 18 is braced at its connection to the associated arm 18, by a triangular gusset 26 made rigid with the arm 18 and bar 22.

For the purpose of effecting the up-and-down swinging movement of the arms 18, there is provided a hydraulic cylinder 28, pivotally connected at 30 to the support frame 10 of the lift mechanism, and working in said cylinder is a piston rod 32, the outer end of which is pivotally connected at 34 to arm 18 adjacent the outer extremity of the arm.

The scoop 24, which as previously noted is merely one of many tool units that can be interchangeably carried by the single lift mechanism illustrated, includes a body 36, formed with a flat back plate.

The coupler constituting the present invention has been generally designated at 37, and comprises a pair of brackets connected to the back plate of the scoop or other tool. Referring to Figures 5 and 6, the brackets are spaced transversely of the associated tool, each including a channel support member 38 having outwardly directed longitudinal flanges welded or otherwise rigidly connected in a permanent fashion to the back plate of the tool.

Welded or otherwise fixedly connected to the web portion of the support member 38 is a female coupling member 40. This is also formed from a length of channel stock, and is secured to the channeled support member 38 in back to back relation thereto. Thus, the elongated female member 40 faces rearwardly from the associated tool unit as shown to best advantage in Figure 6.

At its upper end, the female member 40 is closed as at 42, and integral with the end wall 42 is a downwardly and outwardly projecting tongue 44. At opposite sides of tongue 44, weld material 45 or the like is employed as a filler, to insure rigidity of the tongue 44 relative to the associated parts of the female member 40.

On one of the side walls of the female member 40, a short distance downwardly from the tongue 44, there is formed a rearwardly and outwardly inclined guide lip 46. The guide lips 46 of the transversely spaced brackets are formed on the inner side walls of the female members 40 of said brackets, that is, said guide lips are formed on those side walls that are disposed adjacent one another when the brackets are mounted upon the back plate of the tool element in transversely spaced relation. Thus, the female members can be considered as being identically but oppositely formed.

On the lower ends of the side walls of each female member, there are formed longitudinal extensions 48, 48, the extensions 48 having inclined back edges as shown to best advantage in Figure 6.

Adapted to be removably engaged with the female members of the brackets are elongated, male members 50 of rectangular cross section, the members 50 being of a length closely approximating that of the female members. The members 50, adjacent the upper and lower ends thereof, are made rigid with rearwardly projecting brace plates 52, connected fixedly to elongated support elements 54. Support elements 54 extend in parallel, spaced relation to the male members 50, and in the illustrated example, though not necessarily, are formed of angle iron stock.

The provision of the plates 52 results in the spacing of the male members forwardly from the support elements 54, for a purpose to be made presently apparent.

Welded or otherwise fixedly attached to the lower ends of the male members are longitudinally extending, outwardly directed flange members 56, which are of obtuse-angular formation as shown in Figures 3 and 6, corresponding to the formation of the back edges of the extensions 48 of the female members.

As a result, the male members can be inserted into rearwardly opening female members, moving upwardly within the female members until the upper extremities of the male members abut against the end walls 42 of the female members. In this position the flange members 56 will engage in back of the inclined edges of the extensions 48 in the manner shown in Figure 3.

Carried by and projecting forwardly from each of the male members is a detent or locking pin 58 (Figure 3) disposed intermediate opposite ends of the male member. The locking pin 58 is axially shiftable within aligned openings formed in the front and back walls of the male member, and straddling the locking pin, immediately in back of the male member 50, is a retracting means for the pin in the form of an arm 60 of inverted U-shape, pivotally connected at its upper end to the back wall of the male member for swinging movement about a horizontal axis extending transversely of the male member.

The legs of the retracting arm 60, at their lower ends, are adapted to receive a cross pin 62 extending through the lock pin or detent 58, said legs having notches 64 for this purpose.

By reason of this arrangement, if desired the lock pin can be readily disassembled from the arm 60, by pulling the lock pin rearwardly, that is to the right in Figure 3, until the cross pin 62 fully disengages from the legs of the arm, after which the lock pin 58 can be rotated in the openings of the male member and the cross pin 62 removed.

The arm 60 limits the forward movement of the lock pin, so that normally, the forward extremity of the lock pin projects a short distance forwardly, out of the opening formed in the front wall of the male member. Therefore, when the male member is inserted in the female member 40, initially the lock pin 58 will be pressed rearwardly, so as to be retracted, the web part of the female member exerting pressure against the forward end of the lock pin for this purpose.

When, however, the male member has been inserted to its maximum extent, the lock pin 58 will be brought into registry with an aperture 66 formed in the web portion of the female member (see Figure 3). As a result under the tendency of a coil spring 68 to expand, the lock pin will engage in the aperture 66 to interlock the male and female members, with the flanges 56 lockably engaged in back of the extensions 48.

The spring 68 as shown in Figure 3 is held under compression between the support element 54 and a shoulder defined upon the lock pin 58, through the provision of a reduced axial extension 69 thereof, which extension projects into the spring.

At its lower end, the support element 54 is connected by a pivot pin 70 to an upwardly projecting extension of the associated support bar 22. As a result, the coupling may be bodily swung about the axis of the pivotal connection 70, as for example between the full line and dash-dotted position of Figure 1.

In the illustrated example, the coupling provides a connection between the scoop 24 and the lift mechanism, whereby the scoop can be tilted about the axis of pivot pins 70 in any position to which the lift mechanism is raised above the ground G. To effect the tilting of the scoop, there is provided a hydraulic cylinder 72 pivotally connected at one end as at 74 to the upper end of frame 10. Projecting out of and working in the cylinder 72 is a piston rod 76, pivotally connected as at 78 at its outer end to the intermediate portion of the support element 54.

It will be seen from the above that the coupling is adapted to provide a quick, automatic connection between the scoop 24 and the support element 54. The male portion of the coupling is left upon the support element, and can be used with any of various female portions carried by different tools that are to be associated with the lift mechanism.

In use, a selected tool unit is mounted upon the male members of the coupling, in the manner previously described herein, with the locking pin automatically engaging with the female members of the selected tool unit. When the connection is made, it is automatically responsive to insertion of the male members in the female members, with said insertion being facilitated through the provision of the longitudinal guide lips 46 on the female members.

As will be noted, the male member has all four sides closed as distinguished from the construction of the female member, which is closed only at three sides. Thus, it is appropriate to consider that the male member has opposed first and second sides 80, 82, respectively, and also has opposed sides 84, 86, respectively. All four of these, as previously noted, are closed. When the male member is in its fully inserted position shown in Figure 3 and also in Figure 4, the first side 80 is in face-to-face contact with the web part of the female member; and the third and fourth sides 84, 86 respectively are in face-to-face contact with the respective side walls of the female member.

As soon as the lock pin engages in the opening 66 of each female member, a connection is provided that is rigid from one to the other of the ends of the respective female members, and it will be seen that the connection is such as to resist stresses imposed upon the coupling in any direction. The male member is lockably engaged with the female member at its front, sides, and back surface, and is retained in engagement by the lock pin, which itself is not required to take on any of the strain of support of the tool unit.

Once the connection is made it is wholly rigid, and the tool unit can be used in the regular manner. For example, in Figure 1 the scoop is shown in horizontal position in the full line and dash-dotted showings of this figure. With the lift mechanism lowered, the scoop may be horizontally positioned against the ground. Then, when the lift mechanism is raised through extension of the piston rod 32, the scoop can be tilted from its full line to its dash-dotted position by extension of the piston rod 76. The coupling does not interfere with normal operation of the tool unit in this manner, while still permitting the quick attachment, or the equally speedy detachment, of the tool unit.

The device can of course have many uses, as for example in supporting a platform of a combine, or the lift platform of a hoist. Still further, it permits the rigid connection of tools or implements to any of various other mechanisms or machinery, providing in every instance a wholly rigid, very strong connection effected automatically, responsive to insertion of the male members of the supporting structure into the female members of the tool unit that is to be mounted upon said structure.

In case of necessity and for the purpose of making repairs, the lock pin assembly can be completely knocked down, by manually compressing the spring of the locking pin to permit removal of the clevis-type arm, after which the locking pin is rotated through about 90 degrees, to permit removal of the cross pin 62.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An automatic coupler comprising: a generally rectangular female member open at one end and closed at the other end and having one side open from said one end to a location intermediate the ends of the member, said member including a tongue closing the remainder of said one side, a web part opposite the open side and having an aperture, and a pair of opposed side walls disposed at opposite sides of the web part and formed with integral longitudinal extensions at said one end; a generally rectangular male member including opposed first and second sides and opposed third and fourth sides all of which are closed, said male member fitting snugly in the female member responsive to insertion of the male member into the female member transversely through said open side followed by movement of the male member longitudinally of the female member toward said closed end, the male member having lateral projections at one end, said male member having its other end engaged against said closed end of the female member, its projections engaged with the respective extensions, and its first, third, and fourth sides in face-to-face contact with the web part and the two side walls, respectively, of the female member; and a spring-loaded locking pin slidably mounted in the first and second sides of the male member transversely of the male member, said pin projecting into the aperture in said web part from the first side of the male member, the web part being imperforate except for the aperture to form an abutment for engaging the locking pin and retracting the same during movement of the male member to its fully inserted position.

2. A coupling as in claim 1, further including an arm of inverted U-shape pivoted upon the male member and overlying said second side, said arm including legs embracing the locking pin and having notches; and a cross pin removably carried by the locking pin and having projecting ends removably engaged in said notches, said locking pin, on disengagement of the cross pin from the notches, being rotatable in the male member to offset the cross pin from the notches and thereby permit removal of the cross pin from the locking pin.

3. A coupling as in claim 1, further including a support element extending in parallelism with the male member in confronting relation to said second side; and a plurality of brace plates fixedly connected between the support element and said second side, said locking pin projecting from said second side toward the support element, the spring-loading of the locking pin comprising a compression spring interposed between the support element and the locking pin to normally bias the locking pin away from the support element.

References Cited in the file of this patent

UNITED STATES PATENTS

| | | |
|---|---|---|
| 766,702 | Knight | Aug. 2, 1904 |
| 1,482,944 | Russ | Feb. 5, 1924 |
| 2,194,386 | Dunaway | Mar. 19, 1940 |
| 2,711,805 | Hallead | June 28, 1955 |